United States Patent [19]
Bowen

[11] Patent Number: 4,665,280
[45] Date of Patent: May 12, 1987

[54] UNDERCARPET CABLING FIXTURE

[75] Inventor: Terry P. Bowen, Etters, Pa.

[73] Assignee: AMP Incorporated, Harrisburg, Pa.

[21] Appl. No.: 849,981

[22] Filed: Apr. 10, 1986

Related U.S. Application Data

[63] Continuation of Ser. No. 799,272, Nov. 18, 1985, abandoned, which is a continuation of Ser. No. 639,889, Aug. 13, 1984, abandoned.

[51] Int. Cl.4 .......................... H02G 3/04; H02G 3/26
[52] U.S. Cl. ..................................... 174/71 R; 174/97;
D8/356; D13/13
[58] Field of Search ................. 174/70 C, 71 R, 72 R,
174/72 C, 97; 52/287, 288, 290; D8/356;
D13/13

[56] References Cited

U.S. PATENT DOCUMENTS

| | | | |
|---|---|---|---|
| 2,021,023 | 11/1935 | Romeiser | 174/71 R X |
| 3,455,336 | 7/1969 | Ellis | 174/DIG. 8 X |
| 4,404,425 | 9/1983 | Rich | 174/70 C X |
| 4,419,538 | 12/1983 | Hansell, III | 174/117 F |

FOREIGN PATENT DOCUMENTS

| | | | |
|---|---|---|---|
| 745916 | 5/1944 | Fed. Rep. of Germany | 174/71 R |
| 712618 | 7/1931 | France | 174/97 |
| 60045 | 3/1954 | France | 174/71 R |
| 1145892 | 5/1957 | France | 174/97 |
| 24533 | of 1908 | United Kingdom | 174/71 R |
| 2120464 | 11/1983 | United Kingdom | 174/97 |

Primary Examiner—Laramie E. Askin

[57] ABSTRACT

A fixture for supporting elongate members of undercarpet cables throughout curves is formed with an outer arcuate channel or track and at least one inner channel or track profiled to have a longitudinal length equal to the arcuate length of the outer channel or track. The fixture is provided with tapered outer marginal flanges and assumes a profile at entry and exit ends similar to that of a cable to be received therein.

3 Claims, 4 Drawing Figures

UNDERCARPET CABLING FIXTURE

This application is a continuation of application Ser. No. 799,272, filed Nov. 18, 1985 (now abandoned), which in turn is a continuation of application Ser. No. 639,889, filed Aug. 13, 1984 (now abandoned).

The present invention relates to a fixture for facilitating turns of undercarpet cable and in particular to a fixture which will protect the cable throughout the length of the turn.

Cables which are used for undercarpet situations for transferring light, power or data are all of similar configuration, namely a pair of sloped surface flange portions on the marginal sides of a central web containing one or more elongated members which can be optical fibers, strengthening members and/or electrical conductors of either solid or stranded wire or even coaxial construction. A typical example of such cable can be found in U.S. Pat. No. 4,419,538 which also shows the difficulty in bending this type of cable since the inner sloped flange must be compressed while the outer sloped flange is stretched and the elongated members are relatively longitudinally displaced. It should be appreciated that just trying to bend a flat object in the plane of the object is extremely difficult.

The present invention overcomes the difficulty of the prior art by providing a fixture which will receive only the elongated members of the cable and provide both support and protection for the elongated members throughout the length of the turn. The fixture is a formed rigid member defining at least two tracks between an inlet and an outlet spaced apart in a plane and angularly offset with respect to each other. One of the tracks defines an arcuate path. Each subsequent track is radially inwardly spaced from the arcuate track and defines a curvilinear path of equal length to the length of the arcuate outer path.

The present invention will now be described by way of example with reference to the accompanying drawings in which:

FIG. 4 is a section through the subject fixture taken along line 4—4 of FIG. 3.

Figure 1:
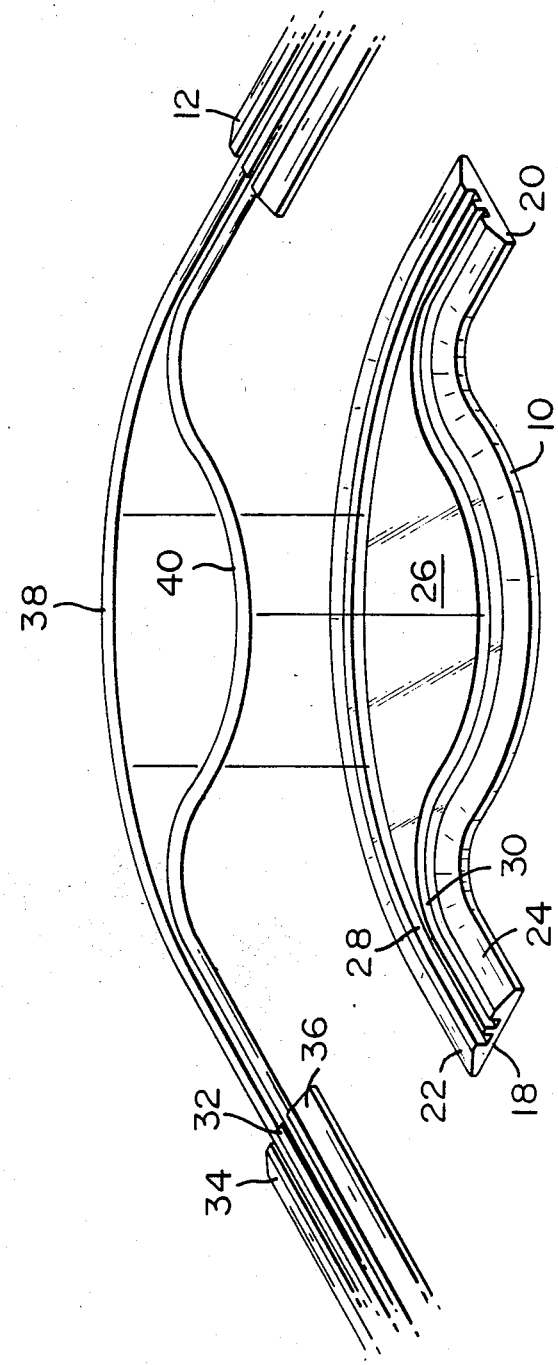
FIG. 1 is a perspective view of the subject fixture with a prepared undercarpet cable exploded therefrom.

The subject fixture 10 has been shown in the drawings in conjunction with an undercarpet cable 12 having two elongate members 14, 16, which are optical fibers in this instance. It is to be understood that the present invention can be utilized with cables carrying electrical conductors of single strand, multiple strand or coaxial configurations and that it is not restricted to the number of fibers, conductors or strength members which can be handled by the fixture.

The fixture 10 is a rigid member, preferably of plastic material, which can be molded or machined. The fixture 10 has a low, rather flat, transverse profile with an entry end 18 and an exit end 20 angled with respect to each other to define a generally arcuate member. The fixture has an outer arcuate tapered shoulder 22 and an inner curvilinear tapered shoulder 24 on opposite sides of a profiled central web 26. The central web includes an arcuate outer track or channel 28 and at least one inner curvilinear track or channel 30. The overall lengths of the channels 28 and 30 are identical, the inner channel having a configuration which accommodates for the difference in arcuate length while providing the same total linear length. The inner track or channel preferably is formed by a plurality of connected segments. The end-most segments curve inwardly in the radial direction to rapidly separate the tracks or channels to facilitate molding of the fixture. An outwardly directed arcuate intermediate segment is connected to the end segments. The inner channel or track configuration need not be truly a sinusoidal configuration but rather simulates a sinusoidal appearance, with the second of said channels having bends that are least in number and least in severity of curvature by said channel being smoothly curved along its length as the lateral distance separating the second channel from the first channel increases progressively from the vicinity of each end portion of the second channel to a smoothly curved midpoint of the second channel. It should be noted that, if there are additional inner tracks or channels, each would be inwardly spaced from the track or channel 30 and would differ only by the radiuses and dimensions forming the various segments. Each such track or channel would still have the requirement of having a total linear length equaling the arcuate length of the outer channel 28.

The cable 12, as previously mentioned, has a pair of optical fibers 14, 16 carried in a central web 32 with tapered marginal flanges 34, 36 to each side of the central web. The normal cable strengthening members of optical fiber cables have been omitted for clarity. Such cable is of well-known design and need not be discussed in detail.

Figure 2:
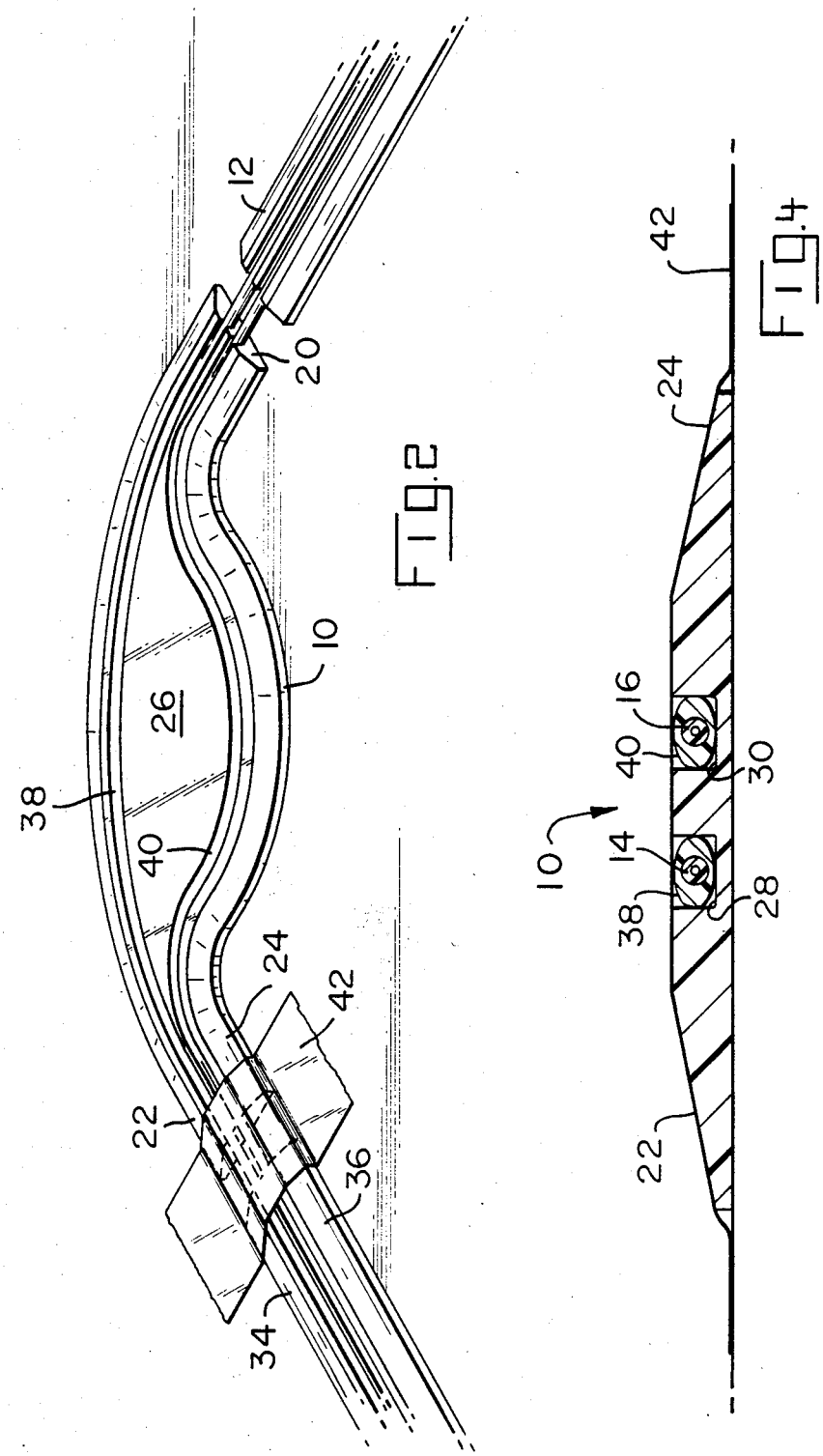
FIG. 2 is a perspective view, similar to FIG. 1, with the cable in place in the subject fixture.
Figure 3:
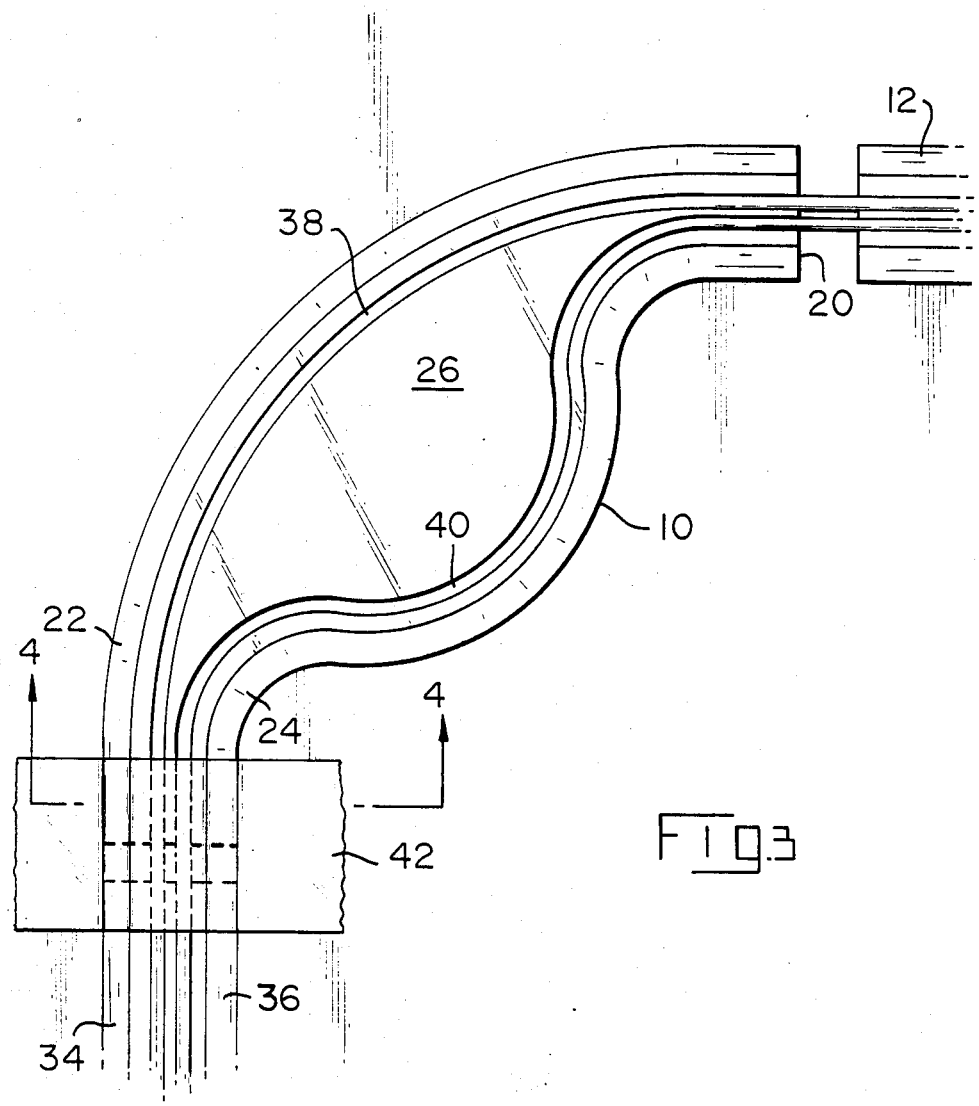
FIG. 3 is a top plan view of the subject fixture with the cable in place.

The present invention is utilized by first preparing a length of the cable 12 as shown in FIG. 1. The tapered marginal flanges 34, 36 are removed and much of the central web 32 is also removed to leave only portions 38, 40 of the web 32 which carry the elongate members or fibers 14, 16. The portions 38, 40 are then placed in the respective tracks 28, 30 of the fixture 10, as shown in FIGS. 2 and 3, and are preferably secured in place by application of an adhesive tape 42. It will be noted from FIG. 2 that it is not critical that the length of cable prepared be exactly the length of the fixture. Small gaps can be tolerated without detrimental effect to the cable or risk to the integrity thereof.

It should also be noted that the present example is shown making a 90 degree turn. The present invention is not restricted to any particular angle and could be more or less than 90 degrees as the situation determines.

The subject fixture 10 may be provided with hold down means (not shown) or can be secured in place by means of adhesives (also not shown).

I claim:

1. An undercarpet fixture for protecting elongated members consisting of, optical fibers, electrical conductors or coaxial cables emanating from a cable web of an undercarpet cable, and for guiding the elongated members along a curved route extending in a space formed by removal of the cable web between first and second portions of the cable, the fixture comprising, a rigid fixture web having a low profile, and a flat top surface, elongated channels in the top surface and side shoulders parallel with respective channels, the fixture being curved along its length, said channels being parallel to each other at their ends, each of said channels having an open side of relatively narrow width and having a recessed bottom wall and side walls for supporting a corresponding elongated member recessed from the top surface, each of said channels having respective open end portions at end edges of the fixture web for axial alignment with a corresponding elongated member emanating respectively from the first and second portions of the cable, a first of said channels being arcuately curved along its length, a second of said channels having bends that are least in number and least in severity of curvature by said channel being smoothly curved along its length as the lateral distance separating the second channel from the first channel increases progressively from the vicinity of each end portion of the second channel to a smoothly curved midpoint of the second channel, the arcuate length of the first channel being substantially equal to the curved length of the second channel, the top surface defining a flat, rigid, and relatively broad area from one side margin to the other, and the side shoulders tapering toward respective side edges of the fixture web.

2. An undercarpet fixture as recited in claim 1, wherein, said end edges are at an angle with respect to each other.

3. An undercarpet fixture as recited in claim 1, wherein, said fixture has a flat bottom surface.

* * * * *